United States Patent [19]

Byon

[11] Patent Number: 5,730,458
[45] Date of Patent: Mar. 24, 1998

[54] SIDE IMPACT PROTECTOR WITH AIRBAG MODULE

[75] Inventor: Sung-Kwang Byon, Seoul, Rep. of Korea

[73] Assignee: Daewoo Electronics Co., Ltd., Seoul, Rep. of Korea

[21] Appl. No.: 699,242

[22] Filed: Aug. 19, 1996

[30] Foreign Application Priority Data

Aug. 18, 1995 [KR] Rep. of Korea ............ 95-25369

[51] Int. Cl.⁶ .................... B60R 21/22; B60N 2/42; B60N 2/46
[52] U.S. Cl. .................. 280/730.2; 280/753; 297/411.32
[58] Field of Search ............ 280/730.2, 730.1, 280/728.1, 728.2, 753, 751; 297/411.32, 411.33, 411.38

[56] References Cited

U.S. PATENT DOCUMENTS

| | | | |
|---|---|---|---|
| 3,623,768 | 11/1971 | Capener et al. | 280/730.2 |
| 3,782,492 | 1/1974 | Hollins | 280/753 |
| 3,985,374 | 10/1976 | Powaska | 280/730.1 |
| 4,097,088 | 6/1978 | Meiller | 297/411.33 |
| 5,324,071 | 6/1994 | Gotomyo et al. | 280/730.1 |
| 5,348,342 | 9/1994 | Haland et al. | 280/730.2 |
| 5,492,361 | 2/1996 | Kim | 280/730.1 |
| 5,511,850 | 4/1996 | Coursey | 280/730.1 |
| 5,531,470 | 7/1996 | Townsend | 280/730.2 |

FOREIGN PATENT DOCUMENTS

| | | | |
|---|---|---|---|
| 611684 | 8/1994 | European Pat. Off. | |
| 2710015 | 3/1995 | France. | |
| 43 05 152 | 9/1993 | Germany | 280/751 |
| 4307421 | 10/1993 | Germany. | |
| 42 17 174 | 11/1993 | Germany | 280/753 |

*Primary Examiner*—Peter C. English
*Attorney, Agent, or Firm*—Beveridge, DeGrandi, Weilacher & Young LLP

[57] ABSTRACT

An airbag system, onto which an airbag can be mounted for restraining an occupant during a side collision of a vehicle, can be used as an armrest. The airbag system has a container having an airbag module inside and a supporting bar for supporting the container, wherein a first end of the supporting bar is pivotally connected to a rear of a seat portion and a second end of the supporting bar is connected to the container. When an impact force is applied to a side of a vehicle, because the supporting bar and the container are transferred from a first position to a second position by first and second step motors, the supporting bar can absorb the impact force transmitted through a door of the vehicle. The airbag module contained in the container is operated and the inflator deploys the airbag, thus the occupant is protected.

28 Claims, 4 Drawing Sheets

SIDE IMPACT PROTECTOR WITH AIRBAG MODULE

BACKGROUND OF THE INVENTION

1. Field of the Invention

The present invention relates to an airbag system, more particularly to a structure for mounting an airbag, onto which an airbag is mounted for restraining an occupant by absorbing impact energy when an impact force is applied to a side panel of a vehicle due to a collision, and which can be used as an armrest.

2. Description of the Prior Art

An inflatable occupant restraining device for restraining an occupant of the vehicle during a front collision is known in the art. In general, the inflatable bag is inflated rapidly in response to the collision of the vehicle. The inflated airbag provides a cushion to protect the occupant of the vehicle from injurious contact with the steering wheel, the instrument panel, and the windshield.

Although of great utility in a situation involving the front collision, the degree of restraint that the inflatable occupant restraining device provides for an occupant of a vehicle during a side collision of the vehicle is less than what is desirable. During a side collision of a vehicle, the occupant of the vehicle is exposed to injurious contact with a door and a window of the vehicle.

The provision of an inflatable airbag for protecting a driver seated adjacent to a side panel of the vehicle during an impact on a side panel of the vehicle by another vehicle has been proposed in the art.

U.S. Pat. No. 4,966,388 discloses an inflatable airbag disposed in a door of a vehicle below the window. A sensor which is coupled to an airbag and an inflator are disposed in the door. During operation, the airbag inflates upwardly and provides a cushion that prevents the occupant from striking elements of the door, and restrains the head of the occupant from exiting out of the window. In this arrangement however, it is impossible to protect the hip and the torso of the occupant from a side impact force.

Therefore, an inflatable airbag has been required to provide the higher degree of restraint for an occupant, who is seated adjacent to a side panel of the vehicle and is subjected to an impact, by absorbing energy that is produced by a side impact force applied to a vehicle body.

To solve the above described problems, various efforts have been made to protect an occupant from a side impact applied to a vehicle body.

U.S. Pat. No. 5,324,072 (issued to Brent Olson and Kirk Storey on Jun. 28, 1994) discloses an improved inflatable dual cushion airbag unit that absorbs the energy that is produced by side impact forces applied to the vehicle body. In Brent Olson, et al. the dual cushion airbag unit is provided within the side panel, the door, or some other part of the vehicle.

The dual cushion airbag unit according to Brent Olson, et al. is mounted at a space between a window and an armrest in an inner panel of the door of the vehicle. When an impact occurs at a side of the vehicle body, an upper airbag is deployed upwardly along the window of the vehicle door and a lower airbag is deployed downwardly in the space between the window and the armrest.

Further, the dual cushion airbag unit may be mounted in a reaction canister or housing disposed behind the armrest. When an impact force is applied to a side of the vehicle body, an upper airbag and a lower airbag are inflated upwardly and downwardly while respectively pushing upper and lower panels formed at a center of the armrest.

The dual airbag unit according to the patent issued to Brent Olson, et al. can protect the hip and the torso of the occupant of the vehicle. However, in the case when the door is pushed inwardly to inside of the vehicle, a problem exists in that the occupant is not adequately protected because the armrest formed at the inner side of the door causes serious injury to the occupant.

SUMMARY OF THE INVENTION

The present invention has been made to overcome the above described problem of the prior art. It is an object of the present invention to provide an airbag system onto which an airbag can be mounted for restraining an occupant during a side collision of a vehicle, and which can be used as an armrest.

To accomplish the above object of the present invention, there is provided an airbag system which comprises:

a container having an airbag module therein;

a supporting means for supporting the container, in which a first end of the supporting means is pivotably connected to a rear of a seat portion, and in which a second end of the supporting means is connected to the container.

The airbag system according to the present invention further comprises a first driving means for pivoting the container from a first position to a second position by a predetermined angle, wherein the first driving means is disposed in the rear of the seat portion, is attached to a frame of the seat portion by a screw, and is a step motor.

A first gear is mounted on one end of a rotating shaft of the first driving means, wherein a first shaft extends through the first end of the supporting means so that one end of the first shaft is rotatably associated with the frame of the seat portion and has a second gear thereon, such that the first gear and the second gear are engaged with each other.

A first braking means is a spring brake and is disposed on the rotating shaft of the first driving means between the first driving means and the supporting means.

The first braking means not only brakes the rotating of the first driving means when the first driving means rotates the supporting means from the first position to the second position by the predetermined angle, but also prevents the supporting means from pivoting even if an outer force is applied to the supporting means.

Also, an airbag system according to the present invention further comprises a second driving means inserted into and disposed in the second end of the supporting means for rotating the container in the opposite direction to the direction which the supporting means rotates from the first position to the second position by the predetermined angle.

The second driving means is a step motor wherein a third gear is mounted on one end of a rotating shaft of the second driving means, and a second shaft extends through the second end of the supporting means so that one end of the second shaft is fixedly associated with one of the surfaces of the container and has a fourth gear thereon such that the third gear and the fourth gear are engaged with each other.

A second braking means is a spring brake and is disposed on the rotating shaft of the second driving means between the second driving means and the container.

The second braking means not only brakes the rotating of the second driving means when the second driving means rotates the container by the predetermined angle, but also prevents the container from rotating although outer forces are applied to the container.

The supporting means is a polygonal hollow bar in which an I-beam is inserted along the central axis thereof, and an elastic resin is filled in the space between the I-beam and the inner surface of the bar.

The supporting means has a square shaped cross-section. The container has a hexahedron shape, and another surface opposite to the surface of the container connected to the second end of said supporting means is formed with a cross cut portion for deploying the airbag.

An airbag module contained in the container includes an inflator and an airbag, and said airbag is arranged in a folded state in the container and is connected to the inflator, and during a side collision of a vehicle, the inflator provides the airbag with an inflatable gas so as to inflate the airbag.

In an airbag system according to the present invention, when an occupant pushes a switch to provide an operation signal for the first and second driving means, which are both step motors, the first and second driving means rotate by the predetermined angle, for example 60° in opposite directions to each other so that the supporting means and the container are respectively transferred from the first position to the second position. Therefore, when an impact force is applied to the side panel of the vehicle in the state that the supporting means and the container are respectively transferred to the second position, the supporting means can absorb the impact force transmitted through a door of the vehicle. At the same time, in the airbag module contained in the container, the inflator provides the airbag with an inflatable gas so that the airbag is deployed. Thus, the occupant is protected.

Also, it is another advantage that during a normal condition when an accident is not occurring and the supporting means and the container are in the second position, the supporting means and the container can be used as an armrest.

BRIEF DESCRIPTION OF THE DRAWINGS

The above object and other advantages of the present invention will become more apparent by describing in detail the preferred embodiment thereof with reference to the attached drawings, in which.

DESCRIPTION OF THE PREFERRED EMBODIMENT

Hereinafter, a preferred embodiment of the present invention will be described in detail with reference to the accompanying drawings.

Figure 1:
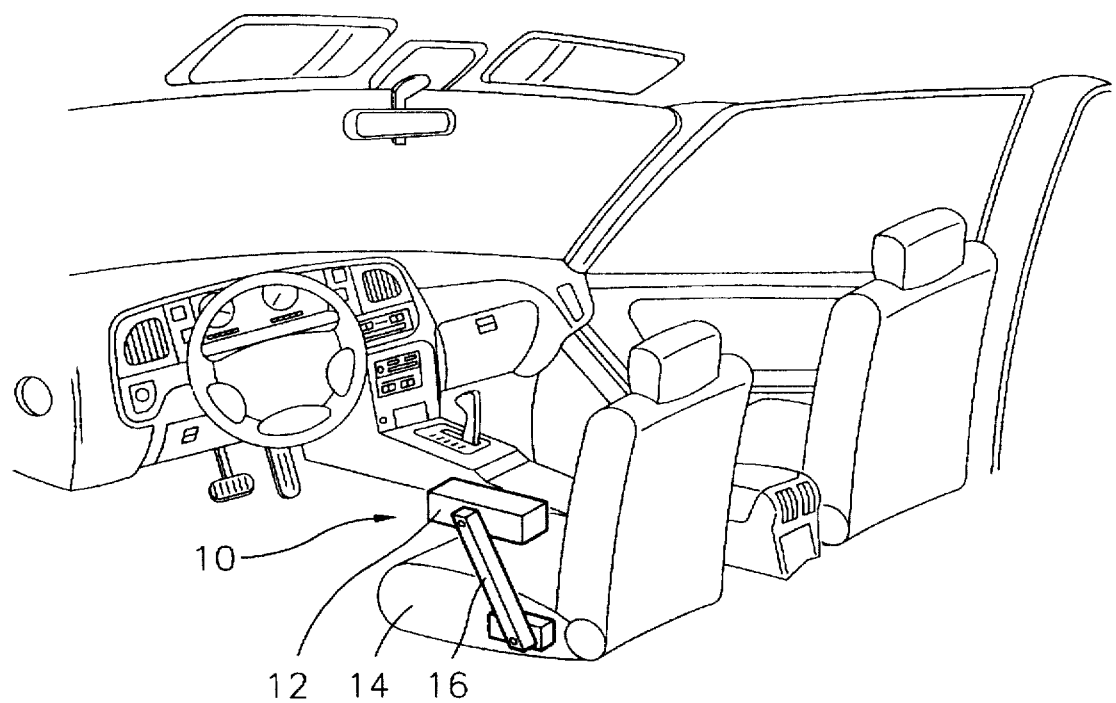
FIG. 1 is a schematic perspective view of an airbag system according to an embodiment of the present invention, which is positioned at a side of the driver's seat of a vehicle.
Figure 2:
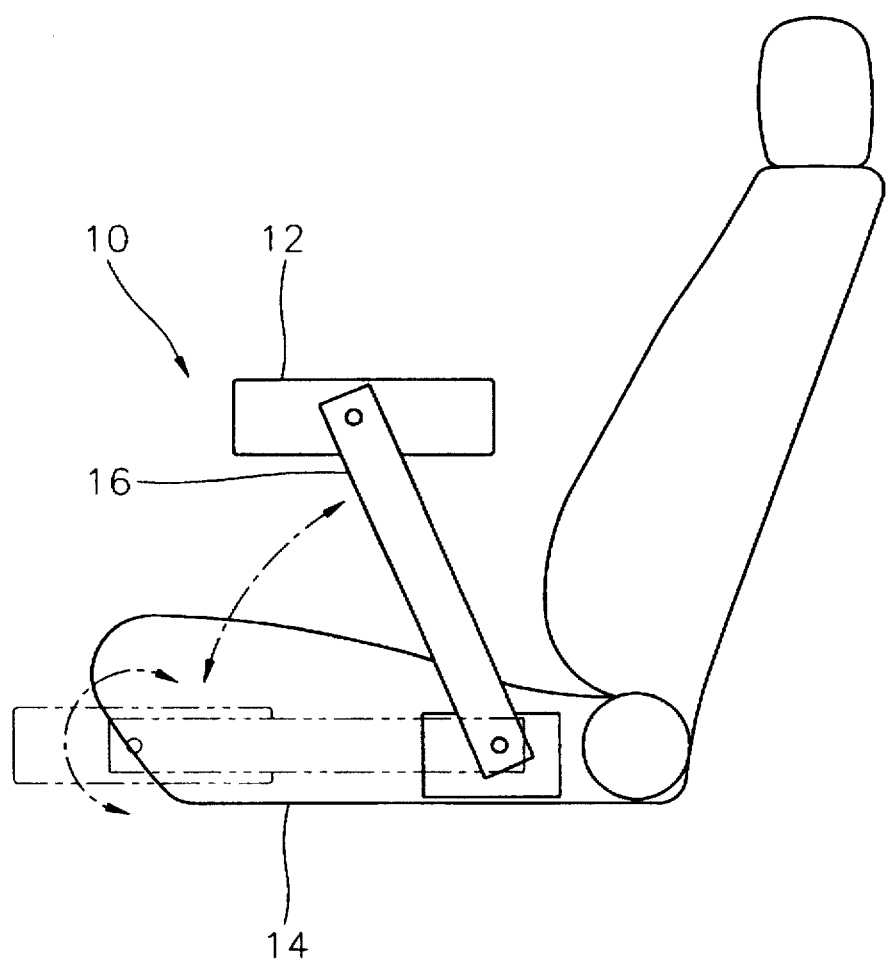
FIG. 2 is a side view of the airbag system in FIG. 1.

FIG. 1 is a schematic perspective view of an airbag system 10 according to an embodiment of the present invention, which is positioned at a side of the driver's seat of a vehicle. FIG. 2 is a side view of airbag system 10 in FIG. 1. In FIGS. 1 and 2, airbag system 10 according to the present invention includes a supporting bar 16 in which a first end is connected to a rear of a seat portion 14 and a second end is associated with one of the surfaces of a container 12, in which an airbag module is contained.

Figure 3A:
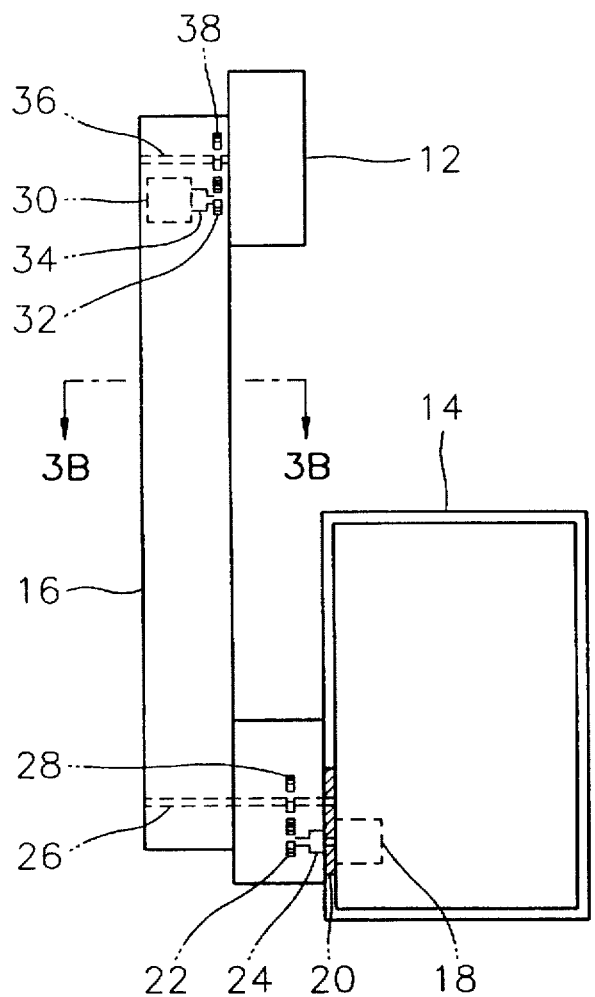
FIG. 3A is a plane view of the airbag system in FIG. 1.

As shown in FIG. 3A, a supporting plate 20, which has a plurality of through holes, is attached by welding, etc. to a lower rear portion of the frame of seat portion 14 disposed opposite to the door (not shown) of the vehicle. On the inner surface of supporting plate 20 is disposed a first driving device 18, for example a step motor, to rotate supporting bar 16 by a predetermined angle from a first position to a second position. The rotating shaft of first driving device 18 extends through one of the holes in supporting plate 20 and first driving device 18 is attached to supporting plate 20 by a screw. A first gear 22 is mounted on an end of the rotating shaft of first driving device 18. A first braking device 24, for example a spring brake, is disposed between first gear 22 and the body of first driving device 18.

A first shaft 26 extends through first end of supporting bar 16, and one end of first shaft 26 is inserted into and rotatably connected to one of the through holes of supporting plate 20. A second gear 28 is mounted on first shaft 26 of supporting bar 16, and has more teeth than first gear 22 which is mounted on the body of first driving device 18. Second gear 28 is engaged with first gear 22 to transmit a rotating force generated by first driving device 18 to supporting bar 16. Preferably, the teeth ratio of second gear 28 and first gear 22 is six to one.

A second driving device 30, for example a step motor, which rotates the container 12 by a predetermined angle from a first position to a second position, is provided at a second end of supporting bar 16. A third gear 32, which has the same number of teeth as first gear 22 that is mounted on the end of the rotating shaft of first driving device 18, is mounted on one end of the rotating shaft of second driving device 30. Also, a second braking apparatus 34, for example a spring brake, is disposed on the rotating shaft of second driving device 30 between the body of second driving device 30 and third gear 32. A second shaft 36 extends through supporting bar 16 between second driving device 30 contained in supporting bar 16 and the second end of supporting bar 16, and is fixedly connected to the center portion of the surface of container 12 in which the airbag module is contained. A fourth gear 38, which has the same number of teeth as second gear 28 disposed on first shaft 26, is disposed on second shaft 36. Fourth gear 38 is engaged with third gear 32 to transmit a rotating force generated by second driving device 30 to container 12. Preferably, the central axes of first shaft 26, second shaft 36, and second driving device 30 are linearly arranged on the central axis of supporting bar 16.

Figure 3B:
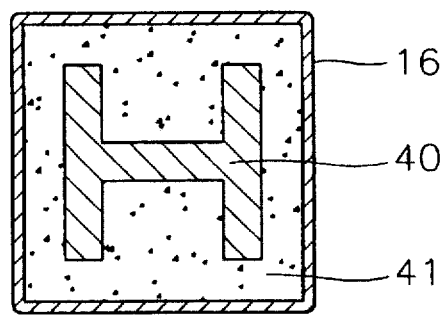
FIG. 3B is a sectional view taken along line 3B—3B in FIG. 3A of a supporting bar of the airbag system.

As shown in FIG. 3B, supporting bar 16 is a polygonal hollow bar having a square shaped cross-section, in which an I-beam 40 is inserted along a central axis thereof, and an elastic resin 41, preferably polyurethane, is filled in a space between I-beam 40 and the inner surface of supporting bar 16.

Figure 4:
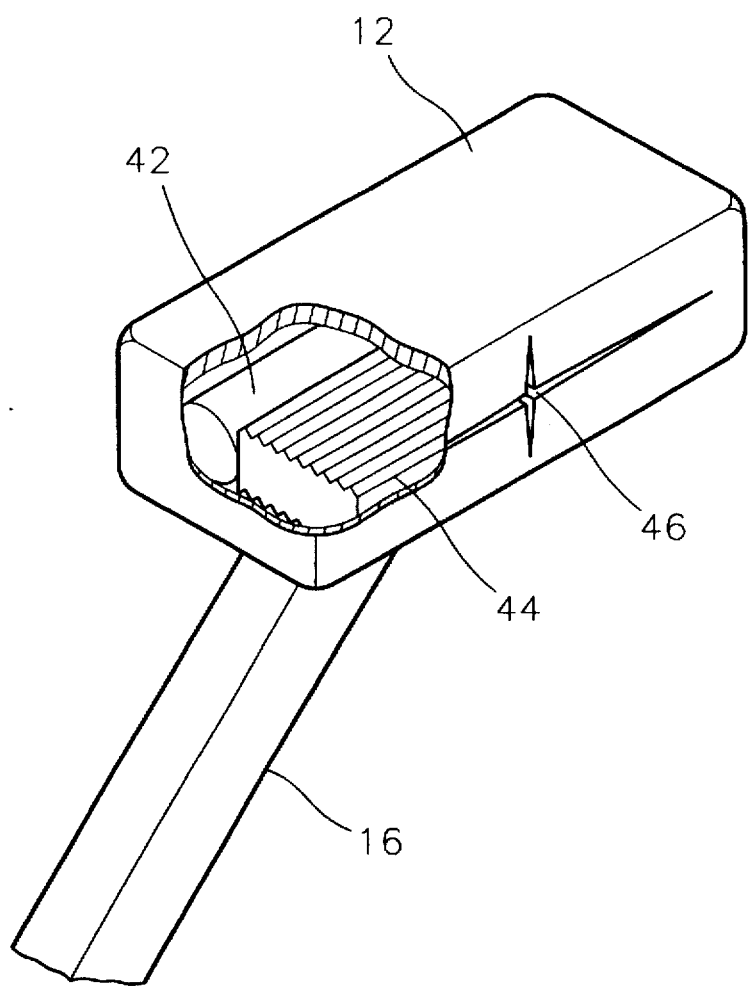
FIG. 4 is a cut perspective view of the container of the airbag system in FIG. 1, which shows the condition of the airbag module contained in the container.

As shown in FIG. 4, container 12 has a hexahedron shape, and the airbag module including an inflator 42 and a folded inflatable airbag 44 is disposed inside container 12. The center of one of the surfaces of container 12, as described above, is fixedly connected to second shaft 36 which extends through the second end of the supporting bar 16, and the other surface opposite to the surface of container 12 which is fixedly connected to second shaft 36 has a cross cut portion 46 for deploying the airbag so that the airbag is deployed when the airbag module is actuated.

Hereinafter, the operation of the each of the elements of the the airbag system according to the present invention described above will be described.

Referring again to FIG. 2, when the vehicle is parked anywhere or is not in motion, airbag system 10 is held in the first position, i.e. supporting bar 16 is held in the lower horizontal position, as shown by the imaginary line, i.e. two dot chain line. When a driver or an occupant operates the vehicle and turns on a switch for operating airbag system 10 so as to prepare for a collision, first driving device 18 and second driving device 30, which are both step motors, rotate supporting bar 16 and container 12 by the predetermined angle, for example 60°. At that time, the rotating shaft of second driving device 30 rotates in the opposite direction to a rotating direction of the rotating shaft of first driving device 18 so that container 12 is held in a horizontal position. That is, when the driver or occupant turns on the switch, current is supplied to first driving device 18 and second driving device 30. Accordingly, as the rotating shaft of first driving device 18 rotates by the predetermined angle, for example 60° in the clockwise direction in accordance with supplying the current to first and second driving devices 18 and 30, supporting bar 16 is rotated by the angle of 60° by second gear 28 engaged with first gear 22. As second driving device 30 also rotates by the predetermined angle, for example 60° in the counterclockwise direction in accordance with the operation signal, simultanously with the rotation of first driving device 18, and as third gear 32 mounted on the rotating shaft of second driving device 30 rotates together with second driving device 30, container 12 is rotated by the angle of 60° by fourth gear 38 engaged with third gear 32.

When first driving device 18 is stopped from rotating after rotating by the predetermined angle, for example 60°, first braking apparatus 24, which is disposed between the body of first driving device 18 and first gear 22 mounted on one end of the rotating shaft of first driving device 18, grasps the rotating shaft of first driving device 18, thereby preventing supporting bar 16 from rotating even if an outer force is applied to supporting bar 16 in the direction that supporting bar 16 was rotating in or in the opposite direction to the direction that it was rotating in. Also, when second driving device 30 is stopped from rotating after rotating by the predetermined angle, for example 60°, second braking apparatus 34, which is disposed between the body of second driving device 30 and third gear 32 mounted on one end of the rotating shaft of second driving device 30 grasps the rotating shaft of second driving device 30, thereby preventing container 12 from rotating even if outer force is applied to container 12 in the direction that container 12 was rotating in or in the opposite direction to the direction that container 12 was rotating in.

Accordingly, in airbag system 10 according to the present invention, when the impact force is applied to the side panel of the vehicle, supporting bar 16 and container 12 are transferred to the second position and absorbs the impact force, because supporting bar 16 absorbs the impact force transmitted through the door of the vehicle, and at the same time, the airbag module contained in container 12 operates such that the inflator 42 deploys the airbag 44, thereby protecting the occupant.

Also, during a normal condition when an accident is not occuring and supporting bar 16 and container 12 are in the second position, supporting bar 16 and container 12 can be used as an armrest.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. An airbag system comprising:
   a container having an airbag module therein, said airbag module including an inflator and an airbag;
   a supporting means for supporting said container, in which a first end of said supporting means is pivotably connected to a rear of a seat portion and a second end of said supporting means is connected with said container; and
   a first driving means, which is disposed in the rear of said seat portion and is attached to an inside of a frame of said seat portion by a screw, for rotating said supporting means from a first position to a second position by a predetermined angle.

2. An airbag system as claimed in claim 1, wherein a first gear is mounted on an end of a rotating shaft of said first driving means, wherein a first shaft extends through the first end of said supporting means so that an end of said first shaft is rotatably associated with said frame of the seat portion and has a second gear thereon, and so that said first gear and said second gear are engaged with each other.

3. An airbag system as claimed in claim 2, wherein a first braking means is disposed on said rotating shaft of said first driving means between said first driving means and said supporting means.

4. An airbag system as claimed in claim 3, wherein said first braking means is a spring brake, and said first braking means not only brakes the rotation of said first driving means when said first driving means rotates said supporting means from the first position to the second position by the predetermined angle, but also prevents said supporting means from pivoting even if an outer force is applied to said supporting means.

5. An airbag system as claimed in claim 1, wherein said first driving means is a step motor.

6. An airbag system as claimed in claim 1, further comprising a second driving means inserted into and disposed at the second end of said supporting means for rotating said container in a direction opposite to a rotation direction of said supporting means from a first position to a second position by a predetermined angle.

7. An airbag system as claimed in claim 6, wherein said second driving means is a step motor.

8. An airbag system as claimed in claim 6, wherein a third gear is mounted on an end of a rotating shaft of said second driving means, and at a second end of said supporting means, a second shaft extends through said supporting means so that an end of said second shaft is fixedly associated with a surface said container and has a fourth gear thereon, and so that said third gear and said fourth gear are engaged with each other.

9. An airbag system as claimed in claim 8, wherein a second braking means is disposed on said rotating shaft of said second driving means between said second driving means and said container.

10. An airbag system as claimed in claim 9, wherein said second braking means is a spring brake and said second braking means not only brakes the rotation of said second driving means when said second driving means rotates said container by the predetermined angle, but also prevents container from rotating even if an outer force is applied to said container.

11. An airbag system as claimed in claim 1, wherein said supporting means is a polygonal hollow bar in which an I-beam is inserted along a central axis thereof, and in which an elastic resin is filled in a space between the I-beam and an inner surface of said bar.

12. An airbag system as claimed in claim 11, wherein said supporting means has a square shaped cross-section.

13. An airbag system as claimed in claim 1, wherein said container has a hexahedron shape, and a first surface of said container opposite to a second surface connected to the second end of said supporting means is formed with a cross cut portion for deploying said airbag.

14. An airbag system as claimed in claim 13, wherein said airbag is arranged in a folded state in said container while being connected to said inflator, and wherein said inflator provides said airbag with an inflatable gas so as to inflate said airbag during a side collision of a vehicle.

15. An airbag system comprising:
   a container having an airbag module therein, said airbag module including an inflator and an airbag;
   a supporting means for supporting said container, wherein a first end of said supporting means is pivotably connected to a rear of a seat portion and a second end of said supporting means is connected to said container;
   a first driving means, which is disposed in the rear of said seat portion and is attached to an inside of a frame of said seat portion by a screw, for rotating said supporting means from a first position to a second position by a predetermined angle; and
   a second driving means inserted into and disposed in the second end of said supporting means for rotating said container in a direction opposite to a rotation direction of said supporting means from a first position to a second position by a predetermined angle.

16. An airbag system as claimed in claim 15, wherein a first gear is mounted on an end of a rotating shaft of said first driving means, and a first shaft extends through the first end of said supporting means so that an end of said first shaft is rotatably associated with said frame of the seat portion and has a second gear thereon, and so that said first gear and said second gear are engaged with each other.

17. An airbag system as claimed in claim 16, wherein a first braking means is disposed on said rotating shaft of said first driving means between said first driving means and said supporting means.

18. An airbag system as claimed in claim 17, wherein said first braking means is a spring brake and said first braking means not only brakes the rotation of said first driving means when said first driving means rotates said supporting means from said first position to said second position by the predetermined angle, but also prevents said supporting means from pivoting even if an outer force is applied to said supporting means.

19. An airbag system as claimed in claim 15, wherein a third gear is mounted on an end of a rotating shaft of said second driving means, and a second shaft extends through the second end of said supporting means so that an end of said second shaft is fixedly associated with a surface of said container and has a fourth gear thereon, and so that said third gear and said fourth gear are engaged with each other.

20. An airbag system as claimed in claim 19, wherein a second braking means is disposed on said rotating shaft of said second driving means between said second driving means and said container.

21. An airbag system as claimed in claim 20, wherein said second braking means is a spring brake and said second braking means not only brakes the rotation of said second driving means when said second driving means rotates said container by the predetermined angle, but also prevents said container from rotating even if an outer force is applied to said container.

22. An airbag system as claimed in claim 15, wherein said supporting means is a polygonal hollow bar in which an I-beam is inserted along a central axis thereof, and in which an elastic resin is filled in a space between the I-beam and an inner surface of said bar.

23. An airbag system as claimed in claim 15, wherein said container has a hexahedron shape, and a first surface of said container opposite to a second surface connected to the second end of said supporting means is formed with a cross cut portion for deploying said airbag.

24. An airbag system as claimed in claim 23, wherein said airbag is arranged in a folded state in said container while being connected to said inflator, and wherein said inflator provides said airbag with an inflatable gas so as to inflate said airbag during a side collision of a vehicle.

25. An airbag system comprising:
   a container having an airbag module including an airbag and an inflator therein, a hexahedron shape, and a cross cut portion for deploying said airbag formed on a surface thereof;
   a supporting means for supporting said container, in which a first end of said supporting means is pivotably connected to a rear of a seat portion and a second end of said supporting means is connected to said container, and wherein the supporting means is a polygonal hollow bar in which an I-beam is inserted along a central axis thereof and an elastic resin is filled in a space the I-beam and an inner surface of said bar;
   a first step motor, which is disposed in the rear of said seat portion and is attached to an inside of a frame of said seat portion by a screw, for rotating said supporting means by a predetermined angle;
   a second step motor inserted into and disposed in the second end of said supporting means for rotating said container by the predetermined angle in a direction opposite to the direction that said supporting means rotates by the predetermined angle;
   a first spring brake disposed on a first rotating shaft of said first step motor between said first step motor and said supporting means not only for braking the rotation of said first step motor when said first step motor rotates said supporting means by the predetermined angle, but also for preventing said supporting means from pivoting even if an outer force is applied to said supporting means; and
   a second spring brake disposed on a second rotating shaft of said second step motor between said second step motor and said container not only for braking the rotation of said second step motor when said second step motor rotates said container by the predetermined angle, but also for preventing said container from rotating even if an outer force is applied to said container.

26. An airbag system as claimed in claim 25, wherein a first gear is mounted on an end of said first rotating shaft of said first step motor, and a first shaft extends through the first end of said supporting means so that an end of said first shaft is rotatably associated with said frame of the seat portion and has a second gear thereon, and so that said first gear and said second gear are engaged with each other.

27. An airbag system as claimed in claim 25, wherein a third gear is mounted on one end of said second rotating shaft of said second step motor, and at the second end of said supporting means, a second shaft extends through said supporting means so that an end of said second shaft is fixedly associated with one of the surfaces of said container and has a fourth gear thereon, and so that said third gear and said fourth gear are engaged with each other.

28. An airbag system as claimed in claim 25, wherein said airbag is arranged in a folded state in said container while being connected to said inflator, and wherein said inflator provides said airbag with an inflatable gas so as to inflate said airbag during a side collision of a vehicle.

* * * * *